United States Patent
Zievers et al.

[11] Patent Number: 6,113,664
[45] Date of Patent: Sep. 5, 2000

[54] FLANGE DENSIFICATION FOR FILTER CANDLES

[75] Inventors: James F. Zievers, LaGrange; Paul Eggerstedt, Plainfield; Elizabeth C. Zievers, LaGrange, all of Ill.

[73] Assignees: Universal Porosics, Inc.; Industrial Filter & Pump Mfg. Co., both of Ill.

[21] Appl. No.: 09/093,044

[22] Filed: Jun. 8, 1998

[51] Int. Cl.[7] ................................................. B01D 39/20
[52] U.S. Cl. ........................................................... 55/523
[58] Field of Search .............................. 55/484, 523, 482, 55/490; 210/323.2

[56] References Cited

U.S. PATENT DOCUMENTS

| | | |
|---|---|---|
| 3,237,775 | 3/1966 | Porter et al. . |
| 4,220,459 | 9/1980 | Hammond et al. . |
| 4,894,070 | 1/1990 | Keidel . |
| 4,968,467 | 11/1990 | Zievers . |
| 5,071,457 | 12/1991 | Schmidt, Jr. et al. . |
| 5,106,501 | 4/1992 | Yang et al. . |
| 5,238,478 | 8/1993 | Zievers . |
| 5,500,029 | 3/1996 | Zievers et al. . |
| 5,849,375 | 12/1998 | Smith et al. . |
| 5,902,363 | 5/1999 | Connolly et al. . |

*Primary Examiner*—David A. Simmons
*Assistant Examiner*—Fred Prince
*Attorney, Agent, or Firm*—Patnaude & Videbeck

[57] ABSTRACT

An improved hot gas filter candle is disclosed including an increase density flange portion adjacent the top of the filter for improving candle service life when the candle is mounted on a tube sheet. The area of flange densification is extended to a position beyond the bottom of the tube sheet. During vibration or swaying of the candle only the denser portion of the candle may impinge on the edge of the tube sheet aperture on which the candle is mounted Further, the denser portion of the candle is not so porous as to draw dirty particles into the clearance between the candle and the tube sheet aperture creating an area of increased stress in the candle adjacent the bottom of the tube sheet aperture.

2 Claims, 2 Drawing Sheets

FLANGE DENSIFICATION FOR FILTER CANDLES

The present invention relates in general to ceramic filter elements of the type commonly known as candles, and more particularly to a ceramic filter candle including an increase density flange portion adjacent the top of the filter for improving service life when the candle is mounted on a tube sheet.

BACKGROUND OF THE INVENTION

Cylindrical candle filter elements are used in the filtration of gasses containing entrained particulate matter. Those cylindrical candle filter elements include a tubular porous ceramic filter having a hollow interior closed at one end and having an annular radial flange at the opposing end. In practice, a plurality of cylindrical candle filter elements are mounted through counterbored apertures on a tube sheet which is suspended across the hollow width of a cylindrical chemical or filtration vessel. In practice, the annular flange fits into the enlarged counterbored portion of the tube sheet mounting aperture and the smaller aperture itself is slightly larger than the outer diameter of the cylindrical portion of the candle filter element.

Such candle filter elements are shown and described in U.S. Pat. No. 4,968,467 and are not as brittle and fragile as earlier known types of ceramic filter elements. It includes a ceramic skeletal base consisting of randomly disposed ceramic fibers bonded together at their intersections with the interstices filled or partly filled with ceramic particles which are bonded to one another and to the skeletal base to form a unitary elongate tubular filter element open at the flanged end and closed at the other end.

Additionally, in U.S. Pat. No. 5,238,478, a candle filter element and a method of making same are disclosed wherein the flange end of the candle filter element and the closed end of the filter element are immersed in a colloidal bath and later dried at a temperature of about 600 degrees Fahrenheit to bond the particles in the colloidal bath to the candle. In this process, the ends of the candle were densified to at least about twice the density of the untreated intermediate filter section. In the aforementioned '478 patent, it was believed that the intermediate portion (non-dipped portion of the candle) extends from a short distance of about 1½ inches or less from the end wall to a short distance of about 1½ inches from the flange with the understanding that these distances were not critical but may vary with the size and strength of the candle.

It is an object of the present invention, generally stated, to provide a new and improved cylindrical candle filter element having an improved flange portion which provides for added use-life of the candle filter.

SUMMARY OF THE INVENTION

The invention is directed in a unitary, generally tubular ceramic filter element adapted for mounting on a round counterbore hole through a tube sheet having a top and bottom surface. The unitary ceramic candle filter element has an open end section, a closed end section and an intermediate porous filter section extending from the open end section to the closed end section. An improvement in the invention is directed to the open end section, and a portion of the intermediate porous filter section adjacent the open end section extending at least a distance of about one-half T from the open end section and has a density of greater than twice the density of a middle portion of the intermediate porous filter section.

BRIEF DESCRIPTION OF THE DRAWINGS

The features of the present invention which are believed to be novel are set forth with particularity in the appended claims. The invention, together with further objects and advantages thereof, may be best understood by reference to the following description taken in connection with the accompanying drawings wherein like reference numerals identify like elements throughout, and in which:

DETAILED DESCRIPTION OF THE PREFERRED EMBODIMENTS

As of the March 1992 filing date of the application which resulted in U.S. Pat. No. 5,238,478, the specification of which is incorporated herein by reference, wherein the top and bottom ends of a filter candle have substantially higher density than the tubular midsection of the filter, in col. 2 at line 60 it is indicated "it will be understood that these distances [of increased densification] are not critical but may vary with the size and strength of the candle." The intent and purpose of the present application is the disclosure of the discovery that at the open flange mounting end of the filter candle, the distance at which the densification is increased is critical to the extent that the increased densification should extend beyond the bottom of any tube sheet on which the flange end of the candle is mounted for reasons to be discussed below.

Figure 1:
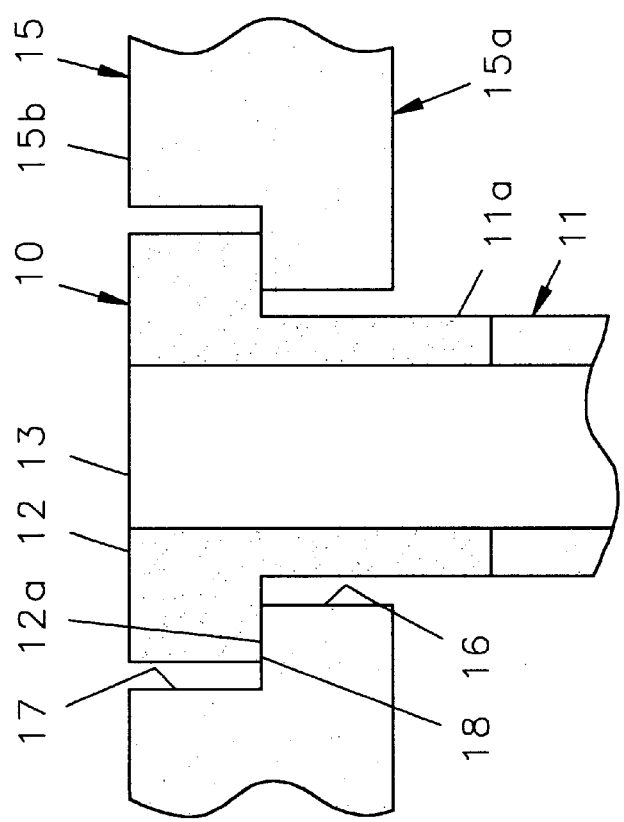
FIG. 1 is a detailed cross-sectional view of a tubular ceramic filter constructed in accordance with the present invention as fitted on a ceramic tube sheet.

Referring to FIG. 1, a tubular filter candle 10, constructed in accordance with the present invention, includes a hollow porous tubular central portion 11 through which gasses may pass and a radially flanged annular end 12 which extends outwardly from the upper end 13 of the filter candle 10. As shown most clearly in FIG. 1, the upper radially flanged portion 12 and the subjacent top portion 11a of the tubular central portion 11 of filter candle 10 are densified by the method disclosed in U.S. Pat. No. 5,238,478 to a distance which extends below the bottom of 15a of, in this figure, a ceramic tube sheet 15. As presently constructed, a ceramic tube sheet 15 is made approximately 3 inches thick in order to provide the strength necessary to support a plurality of filter candles 10 mounted thereon. Each tube sheet 15 includes a plurality of apertures 16 (one shown) through the tube sheet and an increased diameter counterbore 17 which extends about ½ the distance through the tube sheet 15 from the top 15b thereof. An annular ring shaped ledge 18 joins the enlarged diameter counterbore 17 and the aperture bore 16 providing a mounting surface for supporting the bottom surface 12a of the radially extending flange 12 of the improved tubular filter candle 10 of the present invention. The depth of radially extending flange 12 approximates the depth of counterbore 17 being about 1½ inches in thickness.

As shown most clearly in FIG. 1, counterbore 17 has a diameter which is slightly larger than the outer diameter of radially extending flange 12 and the aperture 16 has a diameter slightly larger than the outside diameter of the tubular portion 11 of the filter candle 10. These increased diameters allow for ease of slipping the tubular filter candles 10 through the apertures and also provide space for absorbing any shocks to the system which may tend to move the tube sheet 15 and/or the tubular filter candle 10 mounted thereon while the candles 10 are fairly rigid, they have at least some elasticity. The annular gap allows the candle to flex a small amount.

Figure 2:
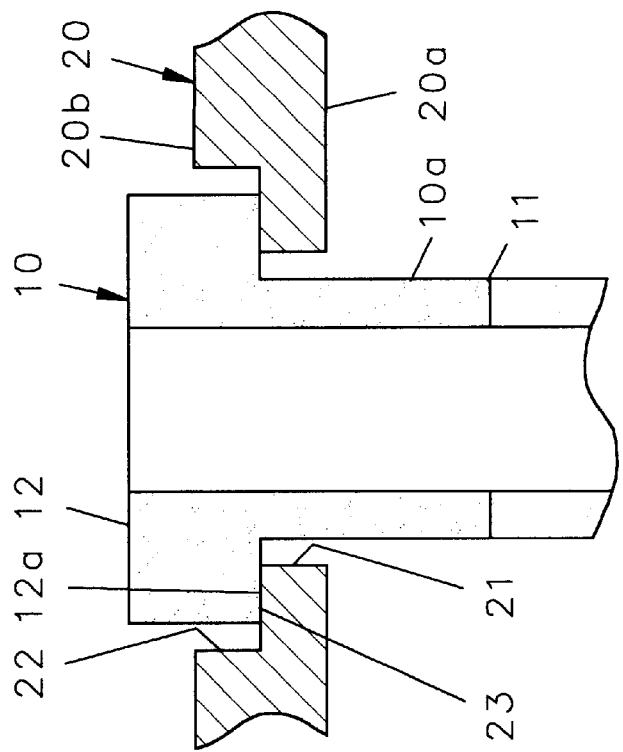
FIG. 2 is a detailed cross sectional view of a tubular ceramic candle filter element constructed in accordance with the present invention as mounted on a stainless steel tube sheet.

Referring to FIG. 2, the filter candle 10 of the present invention is shown mounted on a stainless steel tube sheet 20. While the dimensions of the filter candle of the present invention 10 remain the same, the thickness of a stainless steel tube sheet, for the strength required, may be about ½ the thickness of a ceramic tube sheet 15, i.e., about 1½ inches thick. Aperture 21 through the bottom half of stainless steel tube sheet 20 is slightly larger than the outer diameter 11 of the tubular portion of filter candle 10 and counterbore 22 extends approximately half way through the thickness of tube sheet 20 and is slightly larger than the outer diameter of the radially extending flange portion 12 of tubular filter candle 10 of the present invention. An annular bridging surface 23 extends between the counterbore 22 and the aperture 21 and provides support for the bottom surface 12a of the radially extending flange portion 12 of the tubular filter candle 10 of the present invention, similarly to that of annular surface 18 with ceramic tube sheet 15. Since the thickness of stainless steel tube sheet 20 approximates ½ the thickness of the ceramic tube sheet 15, the top portion of the radially extending flange 12 of the filter candle 10 extends above the top surface 20b of stainless steel tube sheet 20. Since the stainless steel tube sheet 20 is about ½ the thickness of the ceramic tube sheet 15, if the area of increased densification 11a of the tubular portion 11 of the filter candle 10 extends below the bottom surface 15a of ceramic tube sheet 15, then that same increased densified tubular portion 11a will extend farther below the bottom surface 20a of stainless steel tube sheet 20 and the candles 10 may be used interchangeably with any tube sheet.

Figure 4:
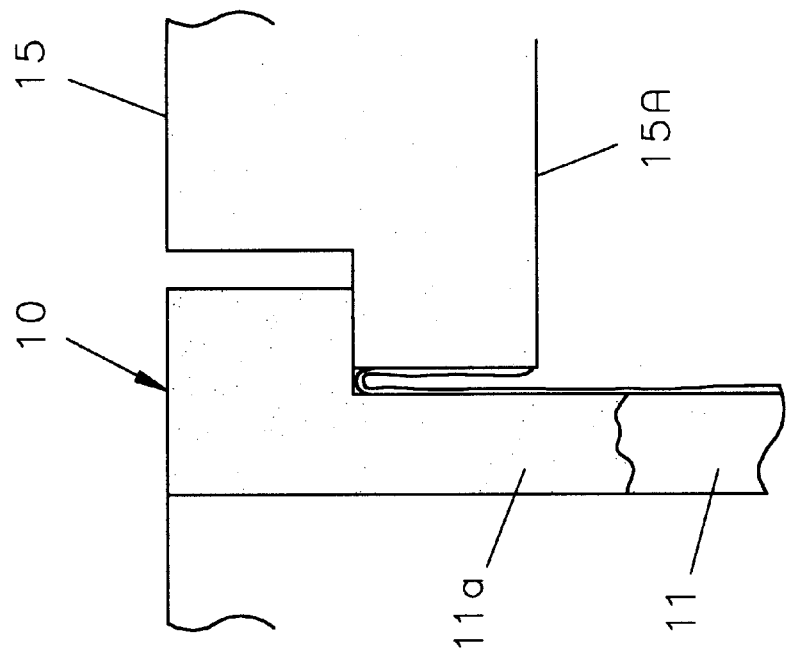
FIG. 4 is a fragmentary enlarged cross-sectional view of the candle shown in FIG. 1 wherein the densification extends farther than the bottom of the tube sheet to provide increased rigidity and use life for the candle of the invention.
Figure 3:
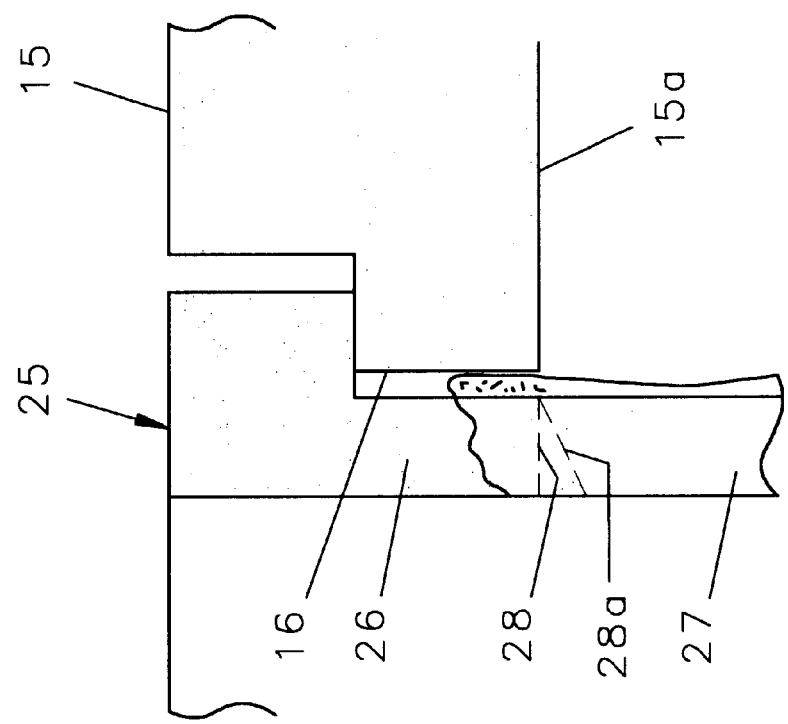
FIG. 3 is an enlarged fragmentary cross sectional view of the candle filter shown in FIG. 1 wherein particulate matter has lodged between the filter candle tubular portion and the tube sheet.

Referring to FIGS. 3 and 4, the reason for the area of increased densification 11a extending below the bottom of the tube sheet 15 is clearly shown. Referring to FIG. 4, when the area of increased densification 11a of the tubular portion 11 of the filter candle 10 of the present invention extends below the bottom surface 15a of ceramic tube sheet 15, particles in the dirty unfiltered air are not drawn through the non-porous densified portion 11a of the filter candle. As such, those particles are not purposely drawn into the small annular hollow area between the aperture 16 of the ceramic tube sheet and the outer surface of the densified portion 11a of the tubular filter candle 10 of the present invention. While some particles may be deposited in that void simply because the gasses therein contain those particles, during the ordinary course of operation of the filter candle, there would be no extraordinary buildup of particles in that void. Maintaining that annular void between the outer surface of the tubular portion 11a of the filter candle 10 of the present invention allows for absorbing shocks in the system that occur during back pulse cleaning, stopping or starting the filter system, etc., and avoids the potential buildup of shear stresses across the thickness of the tubular portion of the filter candle immediately adjacent the bottom surface 15a of aperture 16.

Referring to FIG. 3, a tubular filter candle, generally indicated at 25, is shown mounted in a ceramic tube sheet 15. The area of increased densification 26 of the tubular central portion of the filter candle 27 does not extend, in this embodiment, below the bottom surface 15a of the tube sheet 15. Therefore, the top porous portion 27 of the tubular candle draws particulate matter into the hollow annular void between the outer surface of the tubular portion 27 of the filter candle 25 and the aperture 16 of the tube sheet 15. Drawing the dirty particulate matter into the annular void fills that void with the particulate matter and packs same therein. Since after the hollow annular portion is filled with particular matter, as shown in FIG. 3, the ability of the tubular portion 27 of the filter candle 25 to move relative to the tube sheet 15 and more specifically to the aperture 16 therein is eliminated. After this condition is reached, as shown in FIG. 3, shocks or vibrational impulses to the filter system would increase the shear stress across the porous tubular central portion 27 of the filter candle 25 immediately adjacent the bottom surface 15a of the tube sheet 15. Since the porous portion 27 of the filter candle 25 does not have the increased densification of portion 26 of the filter candle 25, there is increased potential for failure of the porous portion 27 of the filter candle by shear stresses from the tube sheet 15. This increased area of shear stress would occur across an area approximating the dotted line 28 shown as an extension of the bottom surface 15a of tube sheet 15 through the porous portion 27 of the tubular filter candle 25. While that line is shown in FIG. 3 is an extension of the bottom surface 15a of tube shear 15, it will be appreciated that sheet fractures may occur at angles to the points of introduction of the shear stress to an object such as in cup and cone failures, etc. In other words, shear may occur across the porous portion of the tubular sheet at line 28a, instead of at line 28 as shown most clearly in FIG. 3, or at other angles adjacent to those shown at 28 and 28a in FIG. 3.

Referring to FIG. 4, if the filter candle 10 were inserted in the tube sheet 15 as shown in FIG. 4 and used without back pulse cleaning for a substantial period of time, it could be that in the extended normal course of operation of the tube sheet, the void between aperture 16 and the outer surface of the densified candle portion 11a might fill with particulate matter. If that case were to arise, the increased densification of tubular portion 11a extending below the bottom surface 15a of tube sheet 15 would also provide increased strength and protection against potential shear failure at the point where an extension of the bottom surface 15a of tube sheet 15 would intersect the tubular portion 11a of the filter candle 10 of the present invention. In either case, the increased portion of densification 11a provides increased strength for the top mounting portion of the filter candle 10 of the present invention and protects same against potential shock failures by shear through the thinner central tubular portion 11 of the filter candle 10.

It will also be noted that the examples given in FIGS. 3 and 4 showing the ceramic tube sheet 15 would also perform in a similar manner if the thinner stainless steel tube sheet 20 were to be substituted for the ceramic tube sheet 15. In the present invention, the depth of increased densification from inserting the top portion in a colloidal suspension, such as a solution of colloidal silica sold under the trademark NAL-COAG 1050, or other colloidal ceramic suspension, extending below the bottom surface, 15a or 20a, as the case may be, of ceramic filter candle 15 or stainless steel tube sheet 15, will provide the needed protection for prevention of shear stress failure at a location on the thin tubular wall portion of the ceramic filter of the invention 10 adjacent the bottom surface of the tube sheet on which it is mounted.

Thus, an improved filter candle of the present invention has been shown and described which provides increased protection during use against shock induced shear failure of the thinner tubular portion of the filter candle.

While the present invention has been described in connection with particular embodiments thereof, it will be understood that those skilled in the art may make changes and modifications to the invention without departing from the true spirit and scope thereof. Therefore, it is intended by the appended claims to cover all such changes and modifications which come within the true spirit and scope of the invention.

What is claimed:

1. In a unitary generally tubular ceramic filter element used in the filtration of gasses containing entrained particulate matter and adapted for mounting on a round counterbored hole through a tube sheet having a top surface, a bottom surface and a thickness T therebetween, said unitary ceramic candle filter element having an open end section, a closed end section, and an intermediate porous filter section extending from said open end section to said closed end section, and an improvement comprising:

said open section and a portion of said intermediate porous filter section adjacent said open end section extending at least a distance of about ½ T from said open end section being substantially non-porous and having a density greater than twice the density of a middle portion of said intermediate porous filter section.

2. In a unitary generally tubular ceramic filter element used in the filtration of gasses containing entrained particulate matter and adapted for mounting on a round counterbored hole through a tube sheet having a top surface, a bottom surface and a thickness T therebetween, said unitary ceramic candle filter element having an open end section, a closed end section, and an intermediate porous filter section extending from said open end section to said closed end section, said open end section and said intermediate filter section having a centrally disposed bore extending completely therethrough, said intermediate section being tubular and formed of ceramic and being sufficiently porous to pass gas therethrough, said bore being cylindrical and having a substantially constant diameter throughout the length thereof, and an improvement comprising:

said open section and a portion of said intermediate porous filter section adjacent said open end section extending beyond said bottom of said tube sheet as mounted thereon being substantially non-porous and having a density greater than twice the density of a middle portion of said intermediate porous filter section.

* * * * *